(12) United States Patent
Ro et al.

(10) Patent No.: US 7,751,304 B2
(45) Date of Patent: Jul. 6, 2010

(54) APPARATUS AND METHOD FOR TRANSMITTING/RECEIVING PILOT CODE PATTERN FOR IDENTIFICATION OF BASE STATION IN COMMUNICATION SYSTEM USING ORTHOGONAL FREQUENCY DIVISION MULTIPLEXING SCHEME

(75) Inventors: Jung-Min Ro, Seoul (KR); Seok-Hyun Yoon, Suwon-si (KR); Young-Kwon Cho, Suwon-si (KR); Seung-Hoon Choi, Suwon-si (KR); Chang-Ho Suh, Seongnam-si (KR); Su-Ryong Jeong, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1489 days.

(21) Appl. No.: 11/101,847

(22) Filed: Apr. 8, 2005

(65) Prior Publication Data
US 2005/0226141 A1 Oct. 13, 2005

(30) Foreign Application Priority Data
Apr. 9, 2004 (KR) ...................... 10-2004-0024357

(51) Int. Cl.
*H04J 11/00* (2006.01)
*H04W 72/00* (2009.01)
(52) U.S. Cl. ........................ 370/203; 370/210; 455/464
(58) Field of Classification Search .................. 370/210
See application file for complete search history.

(56) References Cited

U.S. PATENT DOCUMENTS

| 2004/0131007 | A1* | 7/2004 | Smee et al. | 370/208 |
| 2004/0190657 | A1* | 9/2004 | Seki et al. | 375/347 |
| 2005/0226140 | A1* | 10/2005 | Zhuang et al. | 370/203 |
| 2006/0172716 | A1* | 8/2006 | Yoshii et al. | 455/226.1 |

FOREIGN PATENT DOCUMENTS

| KR | 10-2001-0010456 | 2/2001 |
| KR | 10-2001-0098657 | 11/2001 |

* cited by examiner

*Primary Examiner*—Daniel J Ryman
*Assistant Examiner*—John Blanton
(74) *Attorney, Agent, or Firm*—The Farrell Law Firm, LLP

(57) ABSTRACT

Provided are an apparatus and method for transmitting/receiving a pilot code pattern used to identify a base station. In the base station, a pilot code pattern determiner determines a code set that includes a number of spreading codes based on a specific ID of the base station. A first spreader spreads a pilot symbol mapped onto an FC with a corresponding spreading code according to the determined code set, and controls gain so as to transmit the pilot symbol at a higher signal level than data. A second spreader spreads data symbols mapped onto the FC with spreading codes of the code set except for the spreading code used for the pilot spreading. A mapper groups a spread signal from the first spreader and spread signals from the second spreader on a TFC basis, and outputs signals that constitute each TFC to points of sub-carriers. An IFFT unit performs an IFFT operation on signals output from the mapper. Because the pilot as well as the data is spread, it is easy to implement the base station. Also, it is possible to identify base stations according to the pilot spreading codes as well as a pilot hopping pattern.

9 Claims, 13 Drawing Sheets

APPARATUS AND METHOD FOR TRANSMITTING/RECEIVING PILOT CODE PATTERN FOR IDENTIFICATION OF BASE STATION IN COMMUNICATION SYSTEM USING ORTHOGONAL FREQUENCY DIVISION MULTIPLEXING SCHEME

PRIORITY

This application claims priority under 35 U.S.C. §119 to an application entitled "Apparatus And Method For Transmitting/Receiving Pilot Code Pattern For Identification of Base Station In Communication System Using Orthogonal Frequency Division Multiplexing Scheme" filed in the Korean Intellectual Property Office on Apr. 9, 2004 and assigned Serial No. 2004-24357, the contents of which are herein incorporated by reference.

BACKGROUND OF THE INVENTION

1. Field of the Invention

The present invention relates to a wideband wireless communication system using an Orthogonal Frequency Division Multiplexing (OFDM) scheme, and more particularly, to an apparatus and method for transmitting/receiving a pilot code pattern to identify a base station.

2. Background of the Prior Art

In an Orthogonal Frequency Division Multiplexing (OFDM) communication system, a transmitter (i.e. a base station (BS)) transmits a pilot sub-carrier (hereinafter, referred to as "pilot channel") signals to a receiver (i.e. a mobile station (MS)). The base station transmits data sub-carrier (hereinafter, referred to as "data channel") signals together with the pilot channel signals. The pilot channel signals are transmitted for synchronization acquisition, channel estimation, and the identification of a base station.

In an OFDM scheme used for high-speed data transmission over wired/wireless channels, data is transmitted using multi-carriers. The OFDM scheme is a kind of a Multi-Carrier Modulation (MCM) scheme for parallel-converting a serial input symbol sequence and modulating the parallel-converted symbols to mutually orthogonal sub-carriers, that is, mutually orthogonal sub-channels.

The MCM system was applied to a military high frequency (HF) radio communication in the late 1950's. The OFDM scheme with overlapping orthogonal sub-carriers was initially developed in the 1970's, but it was difficult to implement the orthogonal modulation between multi-carriers. Therefore, the OFDM scheme had a limitation in the real system implementation.

In 1971, Weinstein et al. proposed that OFDM modulation/demodulation can be efficiently performed using a Discrete Fourier Transform (DFT), which was a driving force behind the development of the OFDM scheme. Also, the introduction of a guard interval and a cyclic prefix as a specific guard interval further mitigated adverse effects of the multi-path propagation and the delay spread on the systems.

Accordingly, the OFDM scheme has been exploited in various fields of digital data communications such as Digital Audio Broadcasting (DAB), digital TV broadcasting, Wireless Local Area Network (WLAN), and Wireless Asynchronous Transfer Mode (WATM). Although hardware complexity was an obstacle to the wide use of the OFDM scheme, recent advances in digital signal processing technology including a Fast Fourier Transform (FFT) and an Inverse Fast Fourier Transform (IFFT) simplified the implementation of the OFDM scheme.

OFDM, similar to a Frequency Division Multiplexing (FDM) scheme, boasts of an optimum transmission efficiency in a high-speed data transmission because it transmits data on the sub-carriers, while maintaining orthogonality between them. The overlapping use of the frequency spectrums leads to an efficient frequency use, and a robustness against the multi-path fading and the frequency selective fading further increase the transmission efficiency in the high-speed data transmission.

Also, the OFDM scheme can reduce the effects of the Inter Symbol interface (ISI) by using guard intervals, which enables the design of a simple equalizer hardware structure. Furthermore, since OFDM is robust against impulsive noise, it is increasingly utilized in communication system configuration.

The pilot channel signals serve as a training sequence and are used for channel estimation between the transmitter and the receiver. Further, the mobile stations can identify their base station by using the pilot channel signals. The locations where the pilot channel signals are transmitted are previously agreed between the transmitter and the receiver. Consequently, the pilot channel signals serve as a reference signal.

A transmission pattern of the pilot channel signal transmitted from the base station is referred to as the pilot pattern. In the OFDM communication system, the pilot pattern is identified by a slope of the pilot channel signals and a transmission start point of the pilot channel signals. The OFDM communication system is designed such that the base stations have their own unique pilot patterns for base station identification.

In addition, the pilot pattern is generated by considering a coherence bandwidth and a coherence time. The coherence bandwidth represents a maximum bandwidth where a channel is constant in a frequency domain, and the coherence time is a maximum time where a channel is constant in a time domain.

Because it can be assumed that the channel is constant within the coherence bandwidth and the coherence time, even though only one pilot channel signal is transmitted within the coherence bandwidth and the coherence time, it is sufficient for synchronization acquisition, channel estimation, and the identification of the base station. Consequently, it is possible to maximize the transmission of the data channel signals, thereby contributing to the improvement in the entire system performance. A minimum frequency interval for transmitting the pilot channel signals is the coherence bandwidth, and a minimum time interval, or a minimum OFDM symbol time interval, for transmitting the pilot channel signals is the coherence time.

The number of the base stations constituting the OFDM communication system is varied depending on size of the OFDM communication system. The number of the base stations increases as the size of the OFDM communication system increases. Therefore, in order to identify all of the base stations, the number of the pilot patterns having different slopes and different start points should be equal to the number of the base stations.

FIG. 1 is a diagram illustrating the possible pilot patterns that can be generated within a coherence bandwidth and a coherence time in a conventional OFDM communication system.

Referring to FIG. 1, the number of possible pilot patterns (that is, the number of possible slopes for the transmission of the pilot channel signal) is limited according to a coherence bandwidth 201 and a coherence time 202. Assuming that a coherence bandwidth 201 is 6, a coherence time 202 is 1 and a slope of a pilot pattern is an integer, there are six possible slopes of s=0 to s=5 for a pilot pattern. A slope for a pilot pattern becomes one of integers 0 to 5. Because the number of possible slopes for a pilot pattern is six, the number of base stations that can be identified using the pilot pattern in the OFDM communication system is six.

In the case where the slope of the pilot pattern is s=6, the slope of s=6 is not distinguished from the slope of s=0, so that only one of the two slopes of s=0 and s=6 is used. In other words, since a slope of s=6 for a pilot pattern has the same pattern as the slope of s=0 for another pilot pattern separated by a coherence bandwidth, the slopes of s=0 and s=6 cannot be distinguished from each other. Therefore, the slopes of the pilot sub-carriers are limited to the coherence bandwidth. In FIG. 1, a shaded circle represents a pilot channel signal separated by the coherence bandwidth 201.

An Orthogonal Frequency Division Multiple Access—Code Division Multiplexing (hereinafter, referred to as "ODFMA-CDM") system will now be described briefly.

FIG. 2 is a diagram illustrating a method for allocating time-frequency resources in an OFDMA-CDM system.

Referring to FIG. 2, a unit rectangle is a time-frequency cell (TFC) having a frequency bandwidth $\Delta f_{TFC}$ corresponding to a predetermined number of sub-carriers (e.g., eight sub-carriers) and having a time duration $\Delta t_{TFC}$ corresponding to a predetermined number of OFDM symbol interval (e.g., one OFDM symbol interval). The number of the sub-carriers constituting the TFC can be variably set depending on system environment. The frequency bandwidth and the time duration occupied by the TFC will be referred to as "TFC frequency interval" and "TFC time interval", respectively.

A frame cell (FC) is defined as a time-frequency interval having a bandwidth corresponding to a predetermined multiple of $\Delta f_{TFC}$ of the TFC (e.g., 256 times) and a time duration corresponding to a predetermined multiple of $\Delta t_{TFC}$ of the TFC (e.g., eight times). FC can have a maximum bandwidth. The frequency bandwidth and the time duration occupied by FC will be referred to as "FC frequency interval" and "FC time interval", respectively.

The entire frequency band of the OFDMA-CDM communication system is divided into M FC frequency intervals. First to (M−1)-th FCs are used for the transmission of the packet data, and an M-th FC is used for the transmission of the control information. The number of the FCs used for the transmission of the packet data and the number of FCs used for the transmission of the control information can be variably set depending on the system environment. The number of FCs used for the transmission of the packet data and the number of FCs used for the transmission of the control information are determined by considering that as the number of FCs used for transmission of control information increases, the number of FCs used for transmission of packet data decreases, thereby causing a reduction in data rate. For the convenience of explanation, the FC used for the transmission of the packet data will be defined as a "data FC" and the FC used for the transmission of the control information will be defined as a "control FC."

In FIG. 2, two different sub-channels A and B are contained in one FC. The "sub-channel" represents a channel over which a predetermined number of TFCs are frequency-hopped before being transmitted according to a predetermined frequency hopping pattern with the passage of time. The number of TFCs constituting the sub channel and the frequency hopping pattern can be variably set depending on the system environment. In FIG. 2, four TFCs constitute one sub-channel.

The OFDMA-CDM scheme will now be described in more detail with reference to FIG. 2.

As described above, the OFDMA-CDM scheme maximizes the performance gain by combining the characteristics of the OFDM scheme and the Code Division Multiple Access (CDMA) scheme. Generally, data corresponding to the sub-carriers assigned to the TFCs are processed using the CDMA scheme and then the resulting signals are processed using the OFDM scheme. The CDMA process includes a process of spreading data by a channelization code uniquely pre-assigned to the sub-carriers and/or a process of scrambling the spread data by a predetermined scrambling code.

In the conventional OFDMA-CDM communication system, data is spread, while pilot signals are not spread. In this case, a process of multiplexing the data and the pilot signals becomes complex. Also, in order to increase the number of base station that can be identified, an interval between the neighboring pilot signals in the frequency domain must vary, from small to large. However, when the data alone is spread, the interval between the pilot signals may be greater than the coherence bandwidth. Generally, the pilot signals are used for the channel estimation as well as the identification of the base station. However, if the interval between the pilot signal is greater than the coherence bandwidth, the performance of the channel estimation is degraded.

SUMMARY OF THE INVENTION

The present invention provides an apparatus and method for efficiently transmitting/receiving pilot pattern to identify a base station in an OFDMA-CDM communication system.

Also, the present invention provides an apparatus and method to identify a base station using a pattern of a spreading code used in the pilot spreading in an OFDMA-CDM communication system.

In addition, the present invention provides an apparatus and method for maximizing the number of pilot patterns for the identification of base a station in an OFDMA-CDM communication system.

According to an aspect of the present invention, there is provided a base station for use in a wideband wireless communication system where an FC has a total frequency band and a predetermined time interval, and the FC includes a plurality of TFCs each of which has at least one OFDM symbol interval and at least one sub-carrier. The base station includes a pilot code pattern generator for storing a code set that includes a number of spreading codes based on a specific ID of the base station, and sequentially generating the spreading codes at an FC period in synchronization with a time interval; a first spreader for spreading a pilot symbol mapped onto a FC with the generated spreading code, and controlling the gain so as to transmit the pilot symbol at a greater signal level than the data; a second spreader for spreading data symbols mapped onto the FC with the remaining spreading codes except the generated spreading code among the spreading codes that are included in the code set; a mapper for grouping a spread signal from the first spreader and spread signals from the second spreader on a TFC basis, and outputting signals constituting each TFC to points of sub-carriers; and an IFFT unit for an IFFT processing output signals from the mapper.

According to another aspect of the present invention, there is provided a mobile station for use in a wideband wireless communication system where an FC has a frequency band and a time interval and the FC includes a plurality of TFCs each of which has at least one OFDM symbol interval and at least one sub-carrier. The mobile station includes an FFT unit for FFT processing received signals; a controller for generating a control signal to process received data on an FC basis; and a base station detector for detecting an FC from an output signal of the FFT unit according to the control signal, despreading TFCs of the detected FC with predefined spreading codes, determining a peak-detected spreading code as a pilot spreading code, and detecting a specific ID of a base station by comparing a sequence of pilot spreading codes with prestored pilot code patterns when determining the pilot spreading codes for a number of FCs.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. A detailed description of well-known features will not be provided for conciseness.

An apparatus and method for efficiently generating a pilot pattern in an OFDMA-CDM according to the present invention will now be described in detail.

The conventional OFDMA-CDM communication system is difficult to implement because the data is spread on a TFC basis, while the pilot signal is not spread. However, according to the present invention, a pilot signal is also spread, thereby making it easy to implement a transmitter. Further, it is possible to identify a base station according to the spreading codes of the pilot signal, in addition to the pilot hopping pattern. Consequently, a great number of base stations can be identified.

Figure 1:
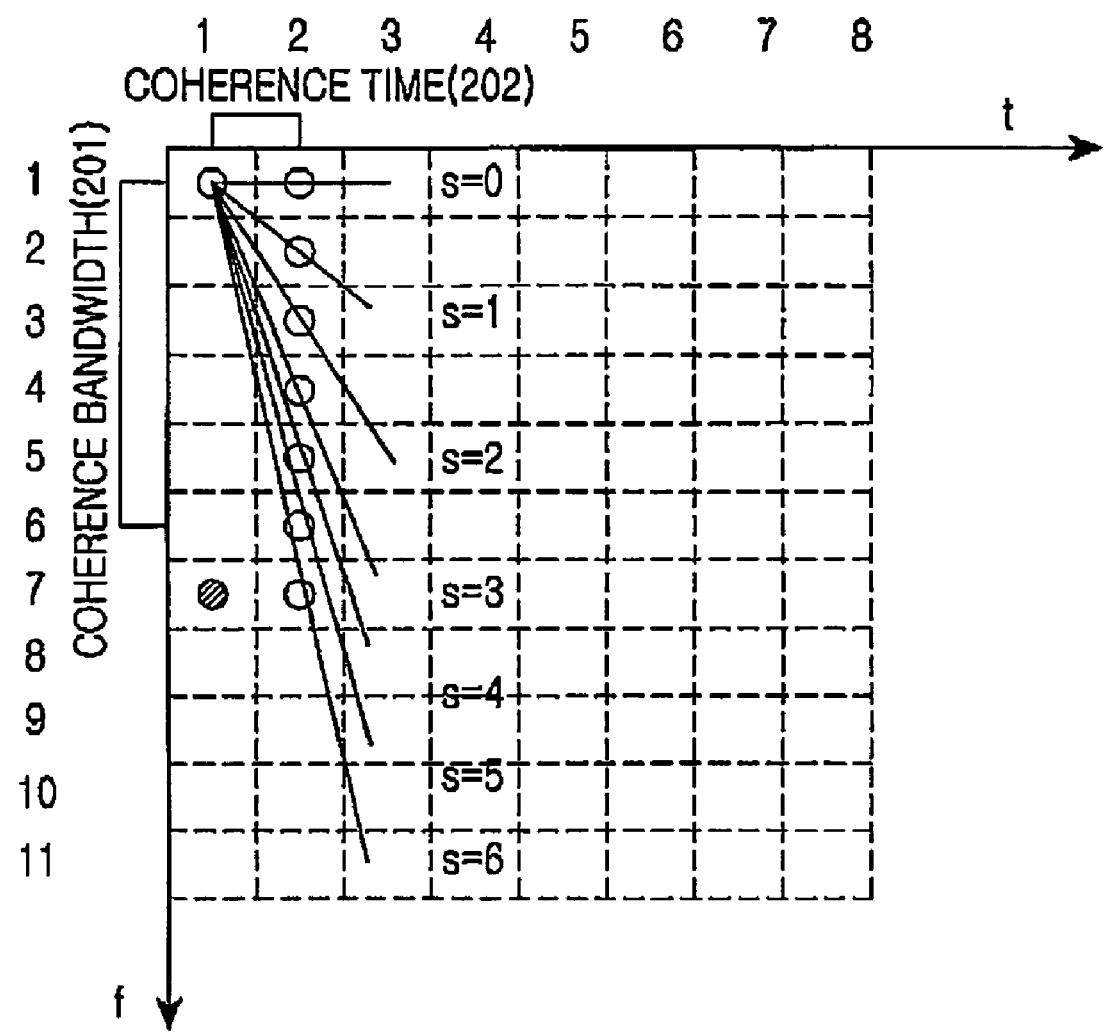
FIG. 1 is a diagram illustrating pilot patterns that can be generated within a coherence bandwidth and a coherence time in a conventional OFDM communication system.
Figure 2:
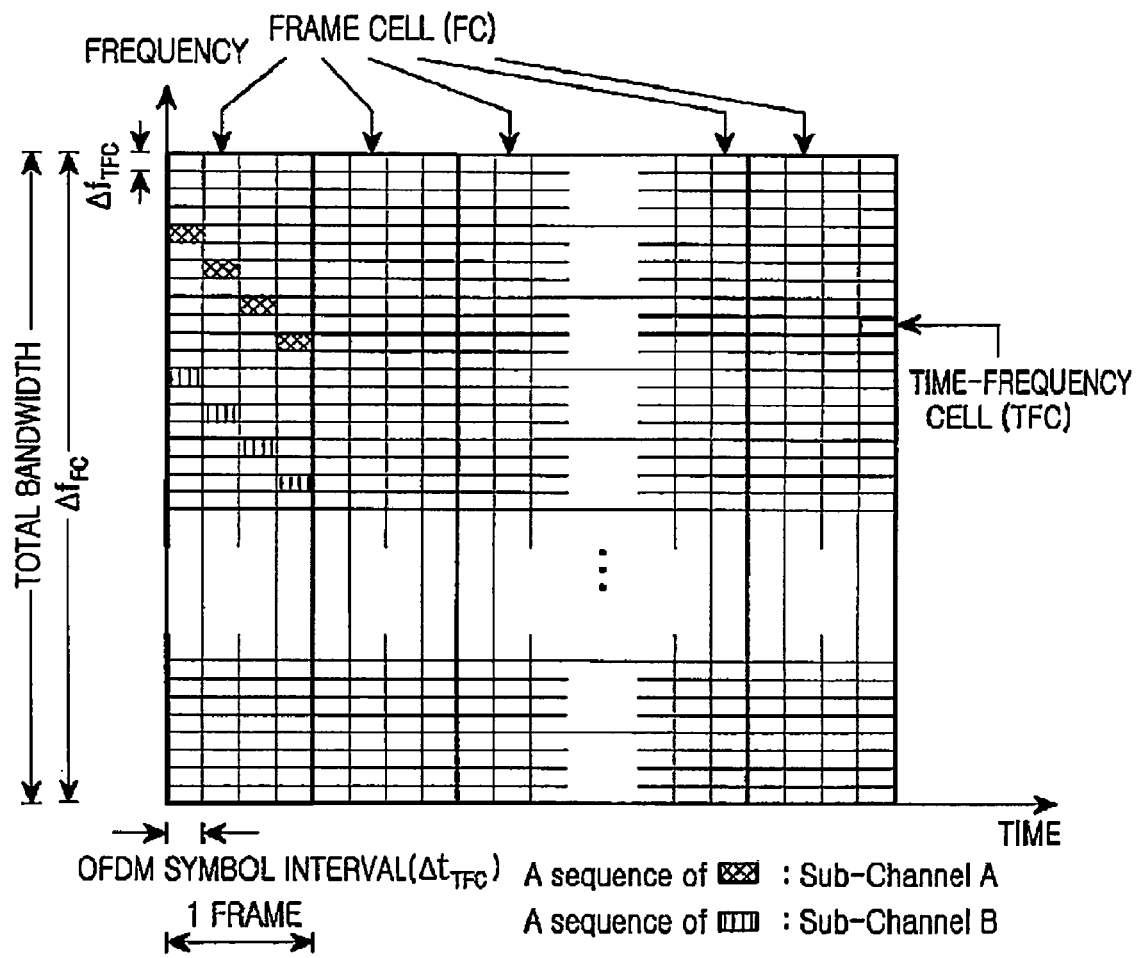
FIG. 2 is a diagram illustrating a method for allocating time-frequency resources in an OFDMA-CDM system.
Figure 3A:
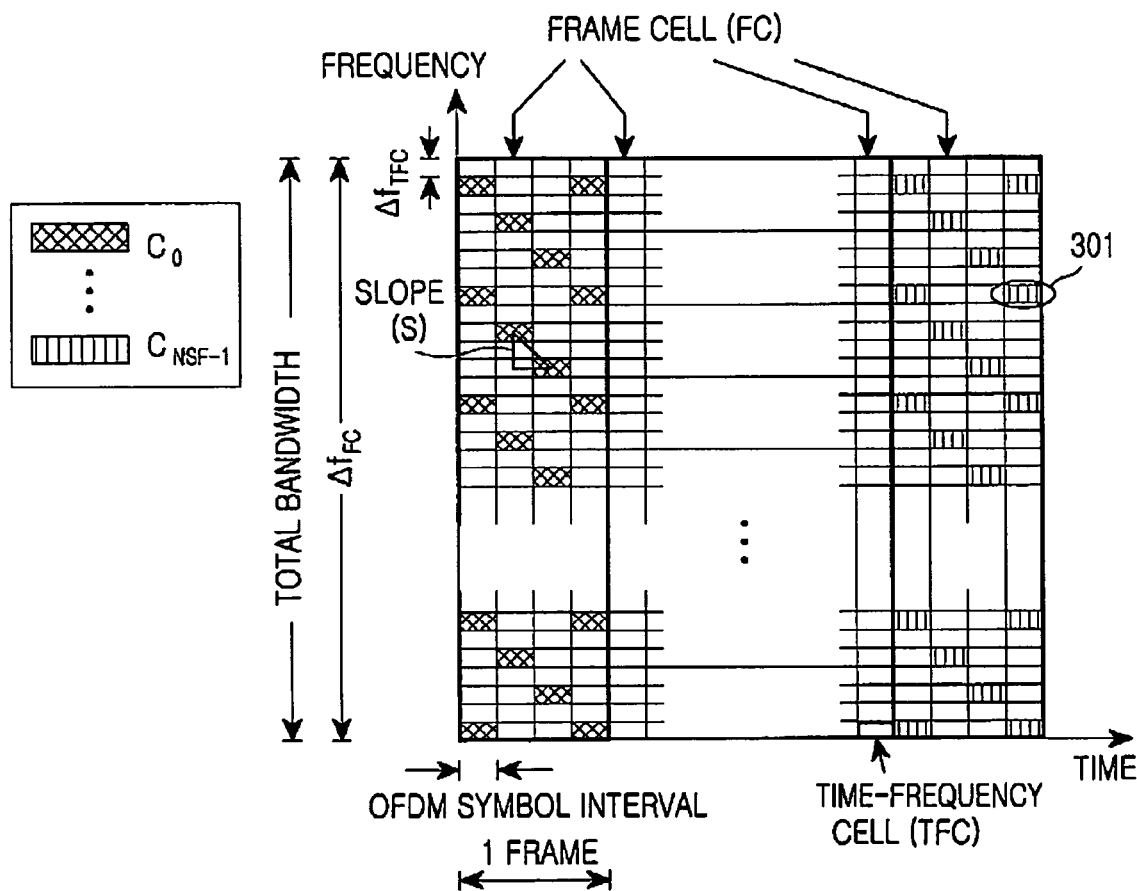
FIGS. 3A and 3B are diagrams illustrating a pilot mapping rule according to an embodiment of the present invention.
Figure 3B:
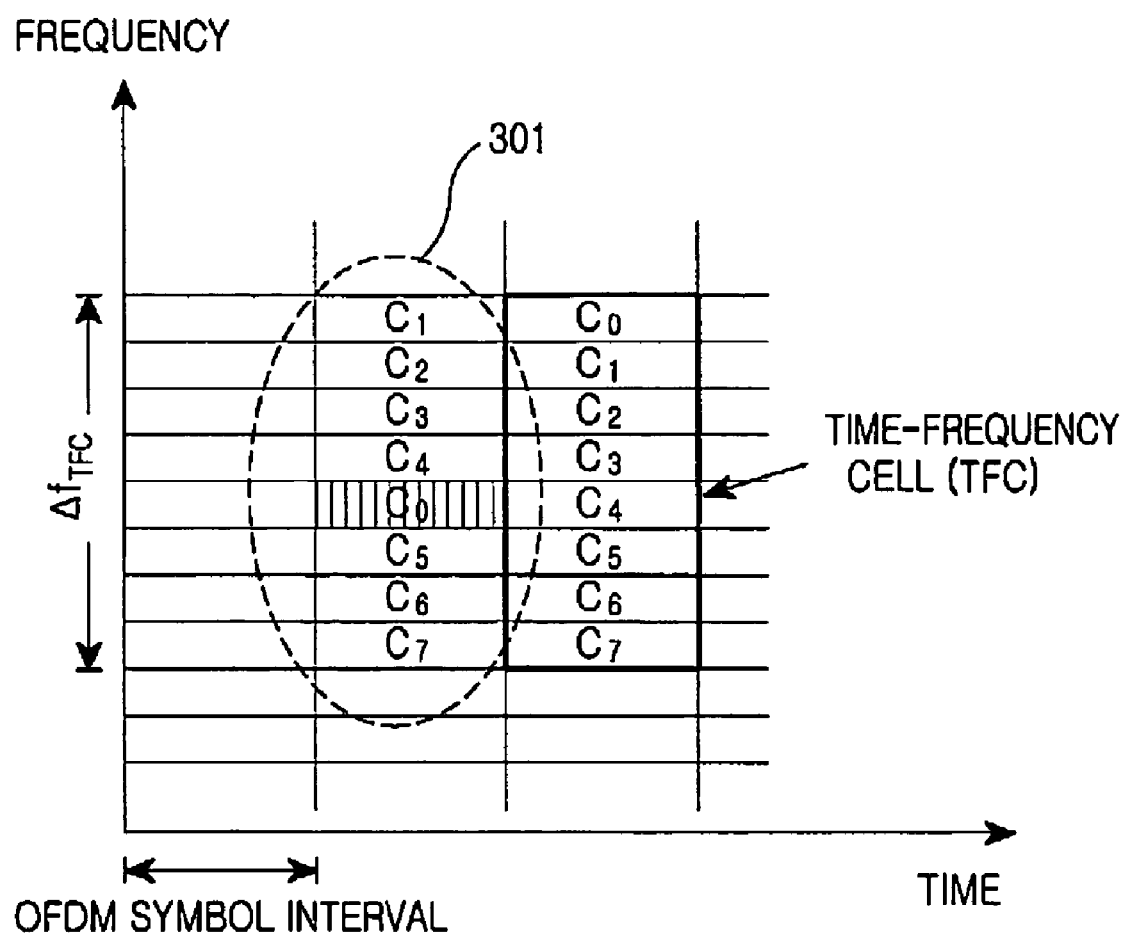
Figure 4:
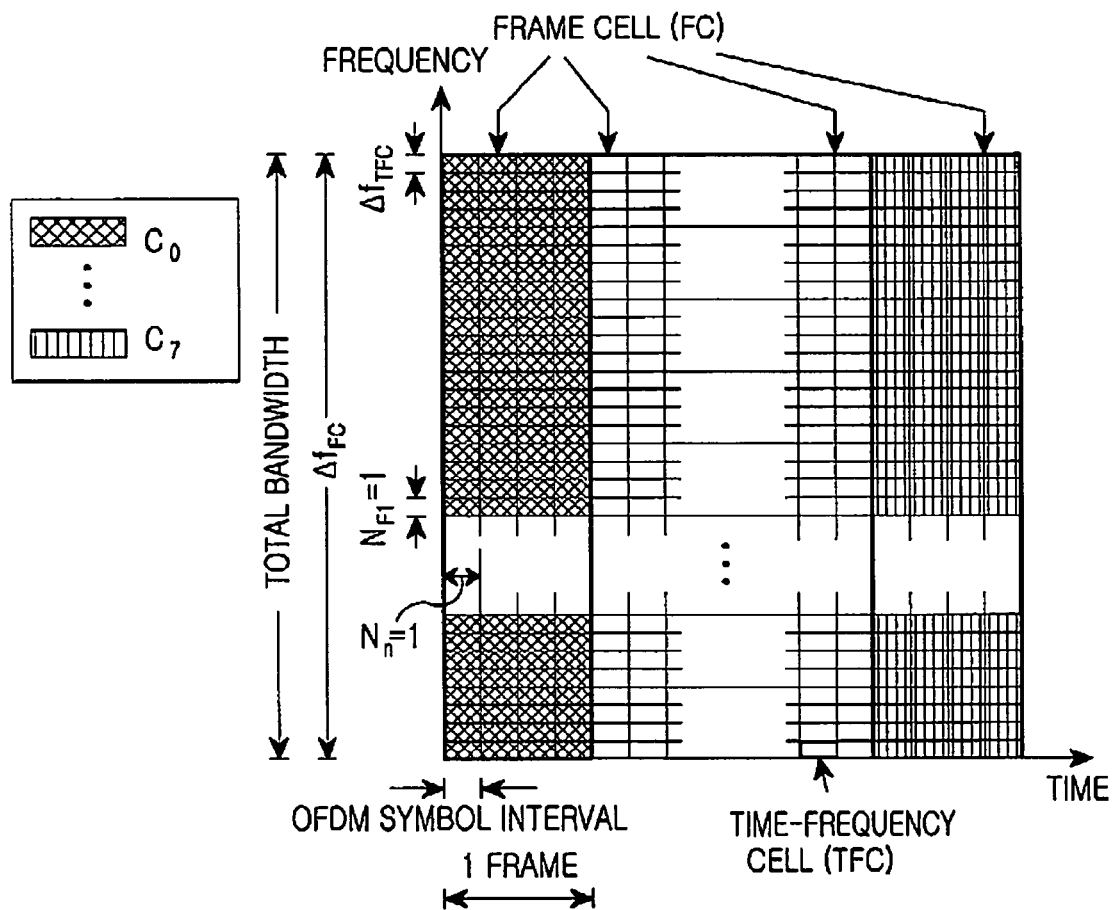
FIG. 4 is a diagram illustrating a pilot mapping rule according to another embodiment of the present invention.
Figure 5:
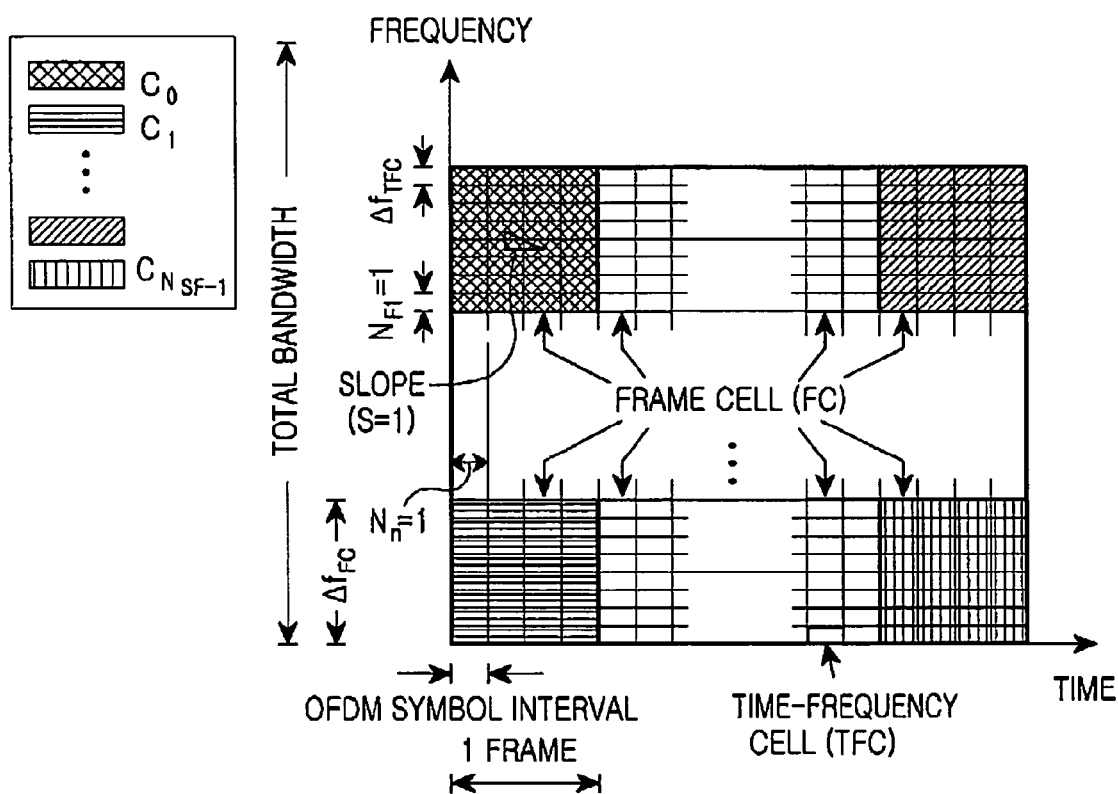
FIG. 5 is a diagram illustrating a pilot mapping rule according to a further another embodiment of the present invention.

A frame cell (FC) structure of an OFDMA-CDM communication system shown in FIGS. 3 to 5 is similar to the FC structure shown in FIG. 2.

A time-frequency cell (TFC) is an allocated resource having at least one OFDM symbol interval and a frequency interval corresponding to $\Delta f_{TFC}$ and represents a minimum unit for data transmission. A frame cell (FC) is an allocated resource having at least one OFDM symbol interval and a frequency interval $\Delta f_{FC}$ corresponding to one or more $\Delta f_{TFC}$. A sub-bandwidth is determined by a frequency bandwidth of the FC. The FC can have a total frequency bandwidth. That is, $\Delta f_{FC}$ represents a sub frequency bandwidth. A sub-channel represents a unit of a predetermined number of TFCs where consecutive data is mapped, and a plurality of sub-channels can be assigned to one FC.

FIGS. 3A and 3B are diagrams illustrating a pilot mapping rule according to an embodiment of the present invention.

Referring to FIGS. 3A and 3B, a plurality of FCs are formed in a frequency-time domain by a predetermined FC frequency interval $\Delta f_{FC}$ and a predetermined FC time interval (frame duration). FC includes a plurality of TFCs, each of which has at least one OFDM symbol interval and a frequency interval corresponding to a predetermined number of sub-carriers. The predetermined number of the sub-carriers is equal to the spreading factor $N_{SF}$. For example, when the spreading factor is 8, one TFC includes eight sub-carriers. After spreading the pilot signals by the spreading factor $N_{SF}$, the pilot signals are mapped onto a TFC of each FC. At this point, a mapping rule of the pilot signals onto the FC is determined by the values $N_{F1}$, $N_{T1}$ and S.

$N_{F1}$ represents a frequency interval between neighboring pilots and its unit is $\Delta f_{TFC}$. $N_{T1}$ represents a time interval between neighboring pilots and its unit is an OFDM symbol interval. S (slope) represents a ratio of a frequency interval to a time interval in neighboring pilots. In FIG. 3A, $N_{SF}=8$, $N_{F1}=1$, and $N_{T1}=2$. In this case, the slope S ($=N_{F1}/N_{T1}$) is ½.

Accordingly, one of $C_0, C_1, \ldots, C_{N_{SF}-1}$ can be used as a spreading code for the pilot signals that are mapped onto each FC. Different spreading codes can be used at the respective FCs. In this case, the spreading codes are orthogonal to one another. A Walsh code may be used as the orthogonal code. That is, for the 0th FC, after one of the $N_{SF}$ spreading codes is selected, the pilot is spread using the selected spreading code and is mapped onto the TFC. In the same manner, for the remaining FCs, after one of the spreading codes is selected, the pilot signal is spread using the selected spreading code and is mapped onto the TFC.

Therefore, assuming that the number of FCs for determining the pilot code pattern is $N_{FC}$, the number of possible pilot code patterns is $N_{SF}^{N_{FC}}$. For example, when the FCs is 5 ($N_{FC}=5$) and the number of spreading codes is 8 ($N_{SF}=8$), the number of possible pilot code patterns is $8^5$. If specific IDs are assigned to the base stations, different pilot code patterns for the base stations can be selected using the specific IDs. This process will be described later with reference to FIGS. 11 and 12.

As described above, the patterns where the pilot signals are mapped according to the slopes can be defined at each FC. Also, when the code-multiplexing is performed at each TFC where the pilot signal is mapped onto a point of a corresponding FC, the orthogonal codes assigned to the pilot can be differently set depending on each FC. In this manner, a great number of base stations can be identified by the pilot hopping pattern and the orthogonal code for each FC.

FIG. 3B is a diagram illustrating the TFC 301 indicated by an elliptical circle in FIG. 3A.

Referring to FIG. 3B, the TFC 301 includes a pilot signal. For example, when there are eight spreading codes, one orthogonal code is assigned for the pilot signal and the remaining seven orthogonal codes are assigned for the data. That is, if the orthogonal code $C_0$ is assigned to the pilot signal contained in the TFC, the remaining orthogonal codes $C_1$ to $C_7$ are assigned to the data. Meanwhile, the eight orthogonal codes $C_0$ to $C_7$ are all assigned to the data in the TFC where the pilot signal is not contained. In the same manner, different orthogonal codes can be assigned to the pilot signals at each FC. The base stations are identified by a combination of the pilot orthogonal codes assigned to a number of the FCs.

FIG. 4 is a diagram illustrating a pilot mapping rule according to another embodiment of the present invention. In FIG. 4, the pilot signal is mapped onto all of the TFCs when $N_{F1}=1$ and $N_{T1}=1$. In this case, the slopes are not used for the identification of the base stations.

Referring to FIG. 4, a plurality of FCs are formed in a frequency-time domain by a FC frequency interval $\Delta f_{FC}$ and a FC time interval (frame duration). Like that in FIG. 3, the FC includes a plurality of TFCs, each of which has an OFDM symbol interval and a frequency interval corresponding to the number of the sub-carriers. Here, the number of the sub-carriers is equal to the spreading factor $N_{SF}$.

After spreading the pilot signal by the spreading factor $N_{SF}$, the pilot signal is mapped onto each TC by $N_{F1}$ and $N_{T1}$. $N_{F1}$ represents a frequency interval between the neighboring pilot signals and its unit is $\Delta f_{TFC}$. $N_{T1}$ represents a time interval between the neighboring pilot signals and its unit is an OFDM symbol interval.

In FIG. 4, $N_{SF}=8$, $N_{F1}=1$ and $N_{T1}=1$, and the pilot signal is mapped onto all of the TFCs. One of $C_0, C_1, \ldots, C_{N_{SF}-1}$ is used as a spreading code for the pilot signals that are mapped onto the FC. Also, different spreading codes can be used at the respective FCs. In this case, the spreading codes are orthogonal to one another. A Walsh code may be used as the orthogonal code. That is, for the 0th FC, after one of the eight spreading codes is selected, the pilot signal is spread using the selected spreading code and is mapped onto the TFC. In the same manner, for the remaining FCs, after one of the spreading codes is selected, the pilot signal is spread using the selected spreading code and is mapped onto the TFC.

If the number of FCs used to determine the pilot code pattern is 5, the number of possible pilot code patterns is $8^5$. If specific IDs are assigned to the base stations, different pilot code patterns for the base stations may be selected using the specific IDs. This process will be described later with reference to FIGS. 11 and 12.

As described above, the FC is determined by the FC frequency interval $\Delta f_{FC}$ and the FC time interval (frame duration). As one example, in FIGS. 3A and 4, the FC uses a total frequency band and the FC is defined by dividing only the time interval. As another example, the FC may be defined by dividing the frequency interval as well as the time interval.

FIG. 5 is a diagram illustrating a pilot mapping rule according to a further embodiment of the present invention. Unlike that described in FIGS. 3A and 4, the FC of FIG. 5 is defined by dividing the frequency interval as well as the time interval.

If the pilot mapping rule described in FIG. 4 is applied to the FC structure shown in FIG. 5, the pilot signal is spread by $N_{SF}$ and is mapped onto each FC by $N_{F1}$ and $N_{T1}$. At this point, since $N_{SF}=8$, $N_{F1}=1$ and $N_{T1}=1$, the pilot signal is mapped onto all of the TFCs, as shown in FIG. 5. One of $C_0, C_1, \ldots, C_{N_{SF}-1}$ is used as a spreading code for the pilot signals that are mapped onto each FC. Also, different spreading codes may be used at each FCs. In this case, the spreading codes are orthogonal to one another. A Walsh code may be used as the orthogonal code. That is, for the 0th FC, after one of the $N_{SF}$ spreading codes is selected, the pilot signal is spread using the selected spreading code and is mapped onto the TFC. In the same manner, for the remaining FCs, after one of the spreading codes is selected, the pilot signal is spread using the selected spreading code and is mapped onto the TFC.

If the number of FCs for determining the pilot code pattern is 10, the combination number of possible spreading codes is $8^{10}$. If specific IDs are assigned to the base stations, different pilot code patterns for the base stations can be applied to the base stations using the specific IDs.

It is assumed that the FC includes a resource having a total frequency band and a time interval and the pilot signal is assigned to all of the TFCs.

Figure 6:
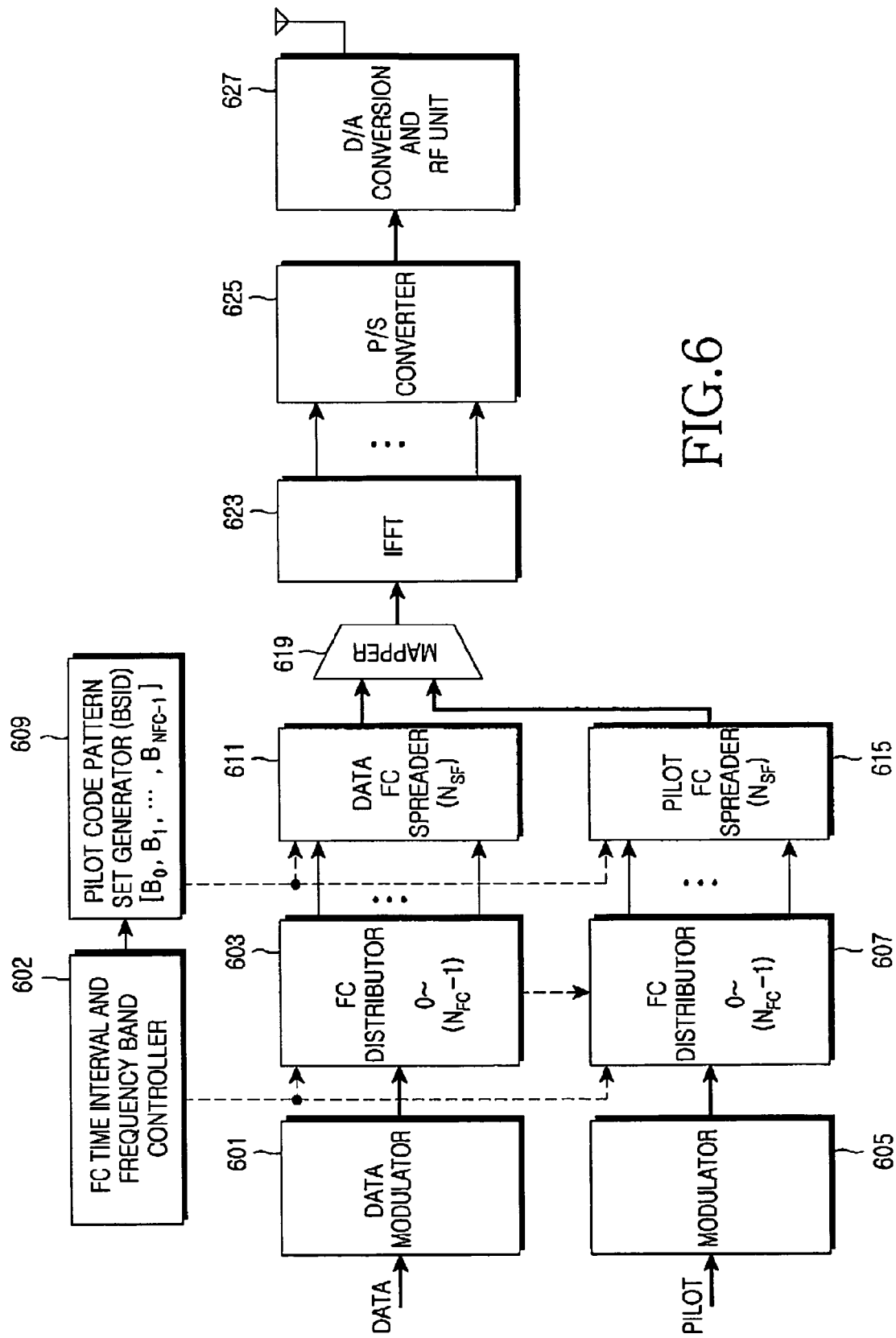
FIG. 6 is a block diagram illustrating a transmitter in an OFDMA-CDM system according to an embodiment of the present invention.

FIG. 6 is a block diagram illustrating a transmitter in an OFDMA-CDM communication system according to an embodiment of the present invention.

Referring to FIG. 6, a data modulator 601 encodes data according to a given code rate and modulates the coded data according to a given order. The data modulator 601 includes a channel coder and a modulator. A turbo coder and a convolution coder may be used as the channel coder. Quadrature Phase Shift Keying (QPSK), 8-ary PSK (8PSK), 16-ary Quadrature Amplitude Modulation (16QAM), and 64-ary QAM (64QAM) may be used as the modulation scheme.

An FC time interval/frequency band controller 602 generates a control signal (frequency band information and time interval information), and sends the control signal to an FC distributor 603. The control signal is used to map output data from the data modulator 601 and a pilot modulator 605 onto an FC, or is used to process them on a frame-by-frame basis. The FC time interval/frequency band controller 602 can control the TFC mapping as well as the FC mapping.

The FC distributor 603 maps the output data from the data modulator 601 onto a corresponding FC under the control of the FC time interval/frequency band controller 602. In the FC structure shown in FIG. 4, the FC distributor 603 sequentially generates the data of the FCs using the total frequency band.

The pilot modulator 605 modulates pilot signal data according to a given order. An FC distributor 607 maps the output data from the pilot modulator 605 onto a corresponding FC under the control of the FC time interval/frequency band controller 602.

A pilot code pattern set generator 609 generates pilot code patterns $B_0, B_1, \ldots, B_{N_{FC}-1}$ using base station identification (BSID), and stores them. Also, under the control of the FC time interval/frequency band controller 602, the pilot code pattern set generator 609 is synchronized with a time (e.g., frame start time) and sequentially generates spreading codes that include the pilot code patterns (or pilot code set) with the FC time interval. Here, $B_i$ represents the number of a code used in an i-th FC.

A data FC spreader 611 spreads the output data from the FC distributor 603 with the remaining spreading codes except the spreading code (e.g., Walsh code) generated from the pilot code pattern set generator 609. When the data FC spreader 611 spreads data of an i-th FC, the data is spread using the remaining codes except the code indicated by $B_i$. For example, when the spreading factor is 8, the number of the sub-carriers constituting the TFC is 8. One of the eight spreading codes is used for the pilot channel and the remaining seven spreading codes are used for the data channel. That is, the data FC spreader 611 groups the output signals from the FC distributor 603 by seven and performs the spreading using the seven codes.

A pilot FC spreader 615 spreads the output data from the FC spreader 607 using the spreading codes generated from the pilot code pattern set generator 609. The gain of the spread signal is controlled to be greater than the spread signal on which the data is loaded. The reason for the gain control is that the pilot detection at the receiver is important. If the pilot FC spreader 615 spreads a pilot of an i-th FC, it spreads the pilot symbol using the code indicated by $B_i$.

A mapper 619 groups the spread signals from the data FC spreader 611 and the spread signals from the pilot FC spreader 615 on a TFC basis, and outputs the signals that include the respective TFCs to points of the sub-carriers. The grouping operation on a TFC basis may be described by obtaining eight chip data by adding the pilot spreading signals and the data spreading signals mapped onto the TFC. Since the pilot signals within one FC are spread with the same spreading code, the pilot FC spreader 615 can generate one pilot spread signal per FC. Also, in the grouping on a TFC basis, the mapper 619 can be grouped such that the pilot spread signal is assigned to all of the TFCs of a corresponding FC or to specific TFCs according to a hopping pattern as in FIG. 3.

An Inverse Fast Fourier Transform (IFFT) unit 623 performs an N-point IFFT operation on the output data from the mapper 619, thereby performing an OFDM modulation. Here, N is a value determined by the number of the sub-carriers in the total frequency band. A parallel-to-serial converter 625 converts the parallel data from the IFFT unit 623 into serial data. A digital-to-analog conversion and RF unit 627 converts the digital data from the parallel-to-serial converter 625 into analog signals. Also, the digital-to-analog conversion and RF unit 627 converts baseband analog signals into RF signals and transmits the RF signals through an antenna.

Although the pilot hopping is not described in detail, a greater number of base stations can be identified by using a combination of the pilot hopping and the pilot code pattern, as shown in FIG. 3A.

Figure 7:
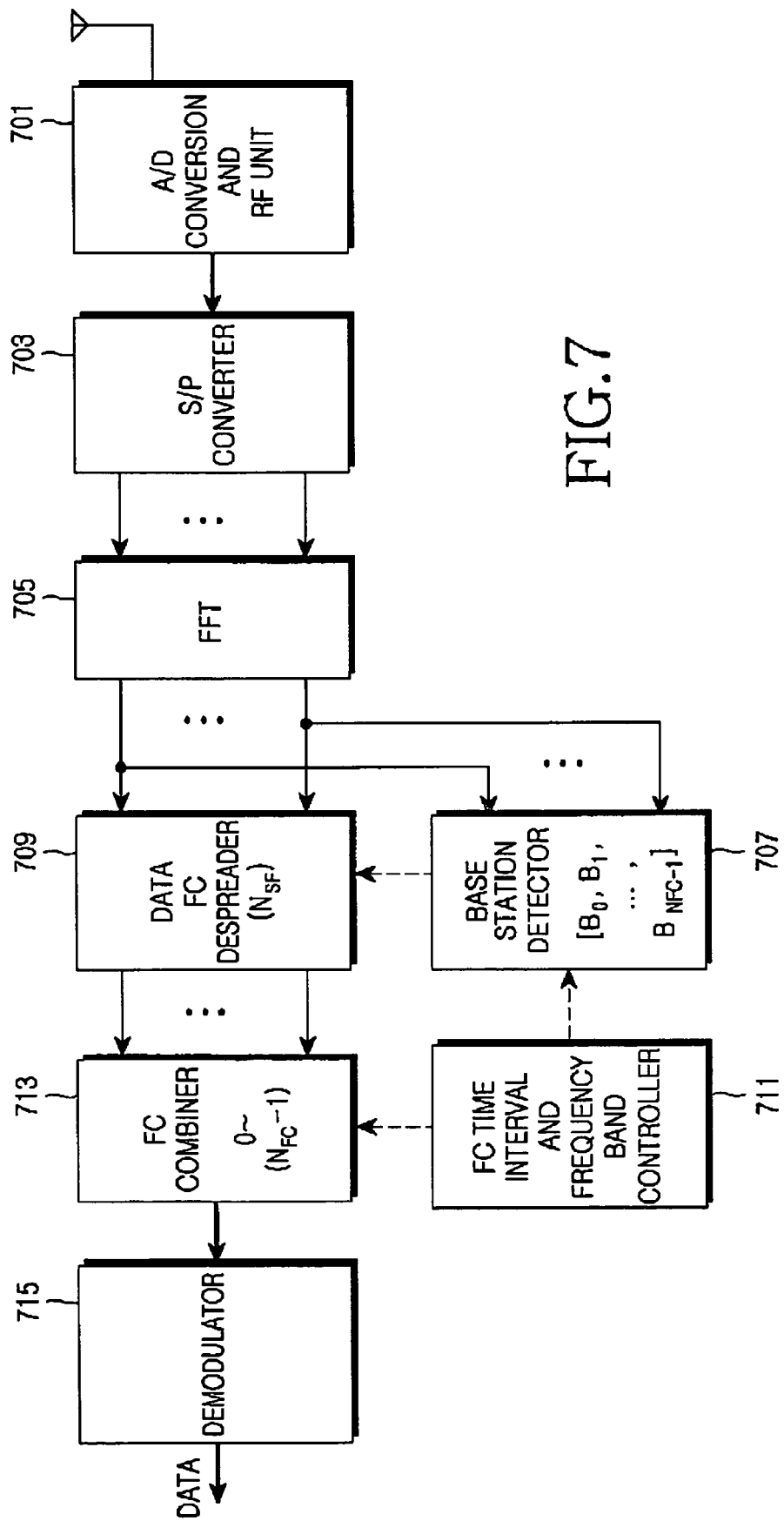
FIG. 7 is a block diagram illustrating a receiver in an OFDMA-CDM system according to another embodiment of the present invention.

FIG. 7 is a block diagram illustrating a receiver in an OFDMA-CDM system according to another embodiment of the present invention.

Referring to FIG. 7, an analog-to-digital conversion and RF unit 701 converts RF signals received through an antenna into baseband signals, and converts the baseband signals into digital signals. A serial-to-parallel converter 703 converts the serial data from the analog-to-digital conversion and RF unit 701 into parallel signals. A Fast Fourier Transform (FFT) unit 705 performs an N-point FFT operation on the output data of the serial-to-parallel converter 703 and simultaneously outputs the OFDM demodulated data to a data despreader 709 and a base station detector 707. Assuming that the total frequency band includes 2048 sub-carriers, 2048 outputs of the FFT unit 705 are simultaneously input to the data FC despreader 709 and the base station detector 707.

An FC time interval and frequency band controller 711 generates a control signal to an FC combiner 713 and the base station detector 707. The control signal is used to process the received data on a FC basis.

Under a control of the FC time interval and frequency band controller 711, the base station detector 707 despreads the output data from the FFT unit 705 on a FC basis and detects a spreading code used in a signal having the highest despreading level. The detected spreading code is determined as a spreading code of the pilot channel. In the same manner, the pilot code patterns $B_0, B_1, \ldots, B_{N_{FC}-1}$ are determined by detecting the spreading codes used in the pilot channels of the respective FCs. The determined pilot code patterns are provided to the data FC despreader 709. During data communication, the data FC despreader 709 despreads the received data with reference to the pilot code patterns. A detailed process of the base station detector 707 will be described later with reference to FIG. 8.

The data FC despreader 709 despreads the output data from the FFT unit 705 with the remaining spreading codes except for the spreading code of the corresponding pilot channel, by using the pilot code patterns provided from the base station detector 707, and outputs the despread data to the FC combiner 713. Under a control of the FC time interval and frequency band controller 711, the FC combiner 713 processes the output data of the despreader 709 on a frame-by-frame basis, and outputs an original symbol sequence to a demodulator 715. The demodulator 715 demodulates the output data from the FC combiner 713 according to a modulation order and decodes the demodulated data according to a code rate, thereby recovering the data.

Figure 8:
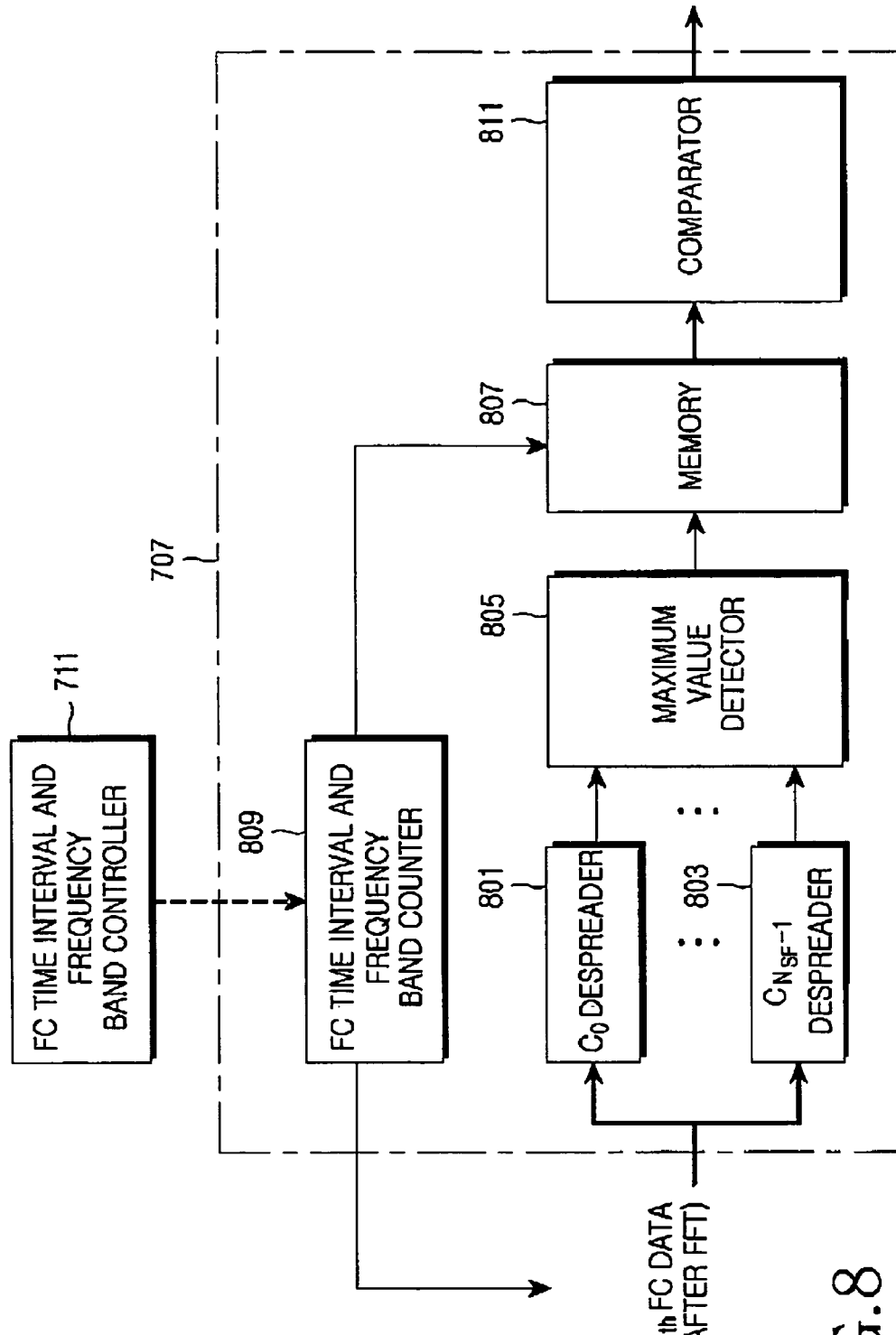
FIG. 8 is a block diagram illustrating a base station detector shown in FIG. 7.

FIG. 8 is a block diagram illustrating the base station detector shown in FIG. 7.

Referring to FIG. 8, an FC time interval and frequency band counter 809 counts the number of FCs according to the control signal output from the FC time interval and frequency controller 711. Also, the FC time interval and frequency band counter 809 sequentially inputs the output data of the FFT unit 705 to despreaders 801 and 803 on a FC basis. That is, the FC time interval and frequency band counter 809 process the data and the pilot signal on a FC basis. Here, the number of despreaders 801 and 803 corresponds to the number of the sub-carriers (or the number of the spreading codes) constituting the TFC.

When data of the 0th FC is received, the data of the TFCs constituting the 0th FC are sequentially transmitted to a $C_0$ despreader 801 and a $C_{N_{SF}-1}$ despreader 803. A start point of the 0th FC can be detected by obtaining a preamble signal. For example, assuming that the number of TFCs that are included in one FC is 160, a first TFC data (8-chip data) is provided to the despreaders 801 and 803, and then second, third, . . . , and 160th TFC data are sequentially provided to the despreaders 801 and 803. The despreaders 801 and 803 despread the input TFC data with a spreading code. At this point, the 0th despreader 801 outputs a symbol despread with the 0th despreading code $C_0$ and the seventh despreader 803 outputs a symbol despread with the seventh despreading code $C_{N_{SF}-1}$.

Then, a maximum value detector 805 accumulates the output symbols of the despreaders 801 and 803 according to the spreading codes, and detects the largest symbol cumulative value among eight symbol cumulative values at a time point when the despreading on one FC is completed. A spreading code corresponding to the largest symbol cumulative value (a spreading code used when a corresponding despreader performs the despreading) is determined as a pilot spreading code and is stored in a memory 807. As described above, the reason why the largest symbol cumulative value is determined as the pilot spreading code is because the pilot signal is transmitted at a higher signal level than the data. It is assumed that the spreading code stored in the memory 807 is $B_0$.

In the same manner, the spreading codes of the pilot channels obtained at the respective FCs are stored in the memory 807. When the FC time interval and frequency band counter 809 counts to an index of a last FC, the memory 807 outputs the stored pilot code patterns $B_0, B_1, \ldots, B_{N_{FC}-1}$ to a comparator 811. The comparator 811 compares the pilot code patterns $B_0, B_1, \ldots, B_{N_{FC}-1}$ with all of the pilot code patterns stored therein. Through the comparison, the base stations are identified. The comparator 811 transmits the information of the identified base station to an upper controller (not shown).

Also, the comparator 811 transmits the base station information (the pilot code pattern) to the data FC despreader 709.

The data FC despreader 709 determines the data spreading codes for the respective FCs, based on the base station information (the pilot code pattern). Then, the data FC despreader 709 despreads the output data of the FFT unit 705 using the determined spreading codes. The information related to the pilot spreading code obtained by the maximum value detector 805 can be directly provided to the data FC despreader. The point in time when the base station detector 707 provides the information to the data FC despreader can be different according to different embodiments.

Figure 9:
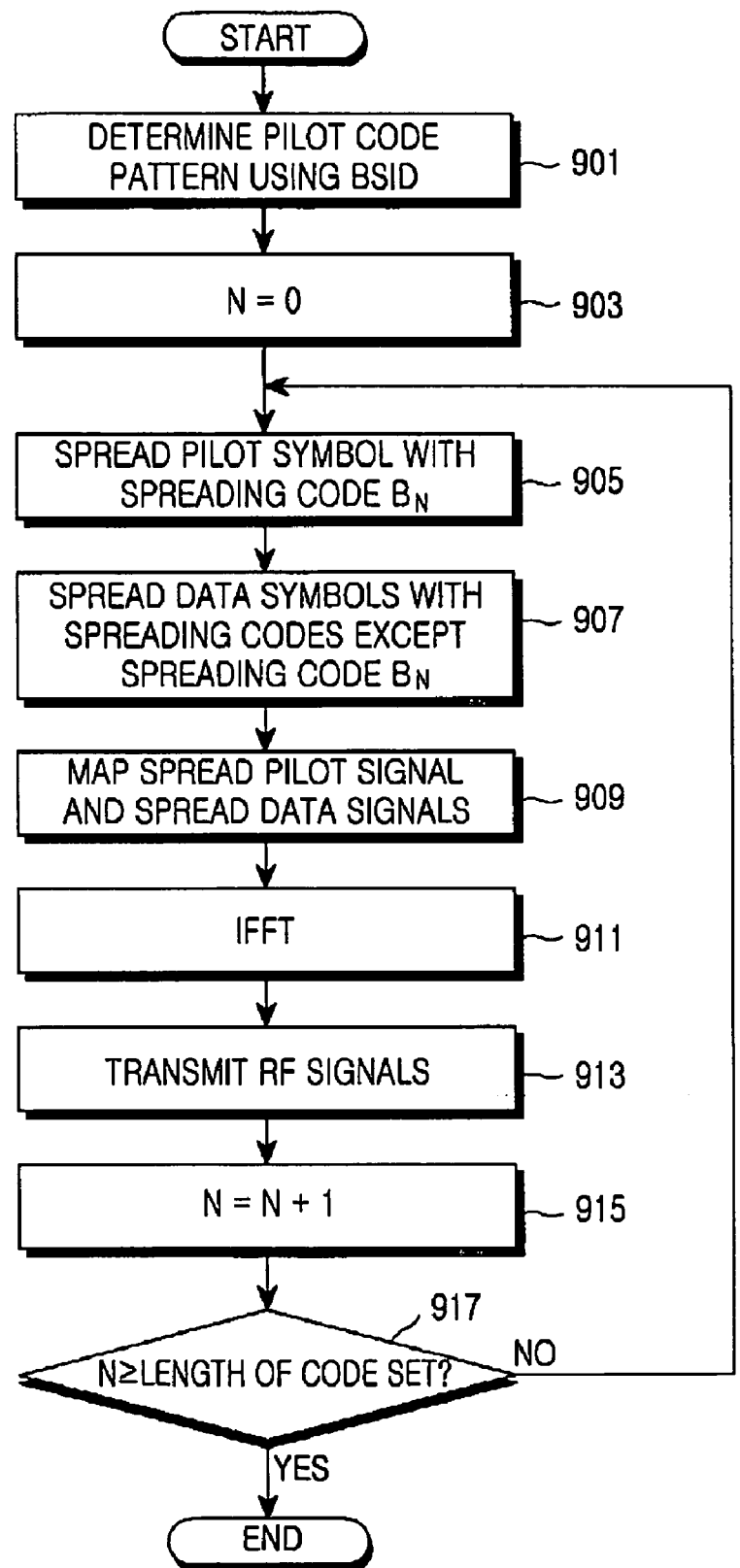
FIG. 9 is a flowchart illustrating a transmitting process of a base station in an OFDMA-CDM according to an embodiment illustrating the present invention.

FIG. 9 is a flowchart illustrating a transmitting process of the base station in the OFDMA-CDM system according to an embodiment of the present invention.

Referring to FIG. 9, in step 901, the base station determines a pilot code pattern (or a pilot code set) using the base station identification (BSID). Because the mobile station identifies the base station using the pilot code pattern, the pilot code pattern is set differently depending on the base station. Before the data communication, the mobile station identifies the base station by detecting the pilot code pattern. During the data communication, the mobile station despreads the data using the remaining spreading codes except the detected pilot spreading code.

In step 903, the base station initializes to "Ø" a variable N representing an FC number to. It is assumed that the number of FCs for determining the pilot code pattern (or a length of the pilot code set) is "5" and the number of spreading codes (a length of spreading codes) is "8". In this case, the data symbol and pilot symbol are spread with a spreading code whose length is 8, and the number of the sub-carriers of the TFC is 8.

In step 905, the base station spreads pilot symbols (modulation symbols) transmitted to an Nth FC with an Nth spreading code $B_N$. Simultaneously, in step 907, the base station spreads data symbols transmitted to the Nth FC with the remaining spreading codes except the spreading code $B_N$.

In step 909, the base station maps the spread pilot signal and the spread data signals with respect to the Nth FC, based on an IFFT input. In step 911, the mapped data is OFDM-modulated through the IFFT operation. In step 913, the base station converts the OFDM-modulated data into serial data, and then converts the serial data into analog signals. Then, the base station converts the analog signals into RF signals and transmits them to the mobile station.

In step 915, after transmitting the Nth FC, the base station increases the variable N by 1. In step 917, the base station determines if the variable N is greater than the length of the pilot code set. If the variable N is less than the length of the pilot code set, the process returns to step 905. A pilot of a next FC is spread with a spreading code next to the spreading code used most recently in the pilot code set. If the variable N is greater than or equal to the length of the pilot code set, the base station decides that a number of FCs equal to the length of the pilot code set have been transmitted and thus ends the process. In fact, because the base station continues to transmit the pilot and data signals, the process is not ended but returns to the step 903. However, a one-time transmission of the signal that allows the identification of the base station is performed in the procedure shown in FIG. 9.

Figure 10:
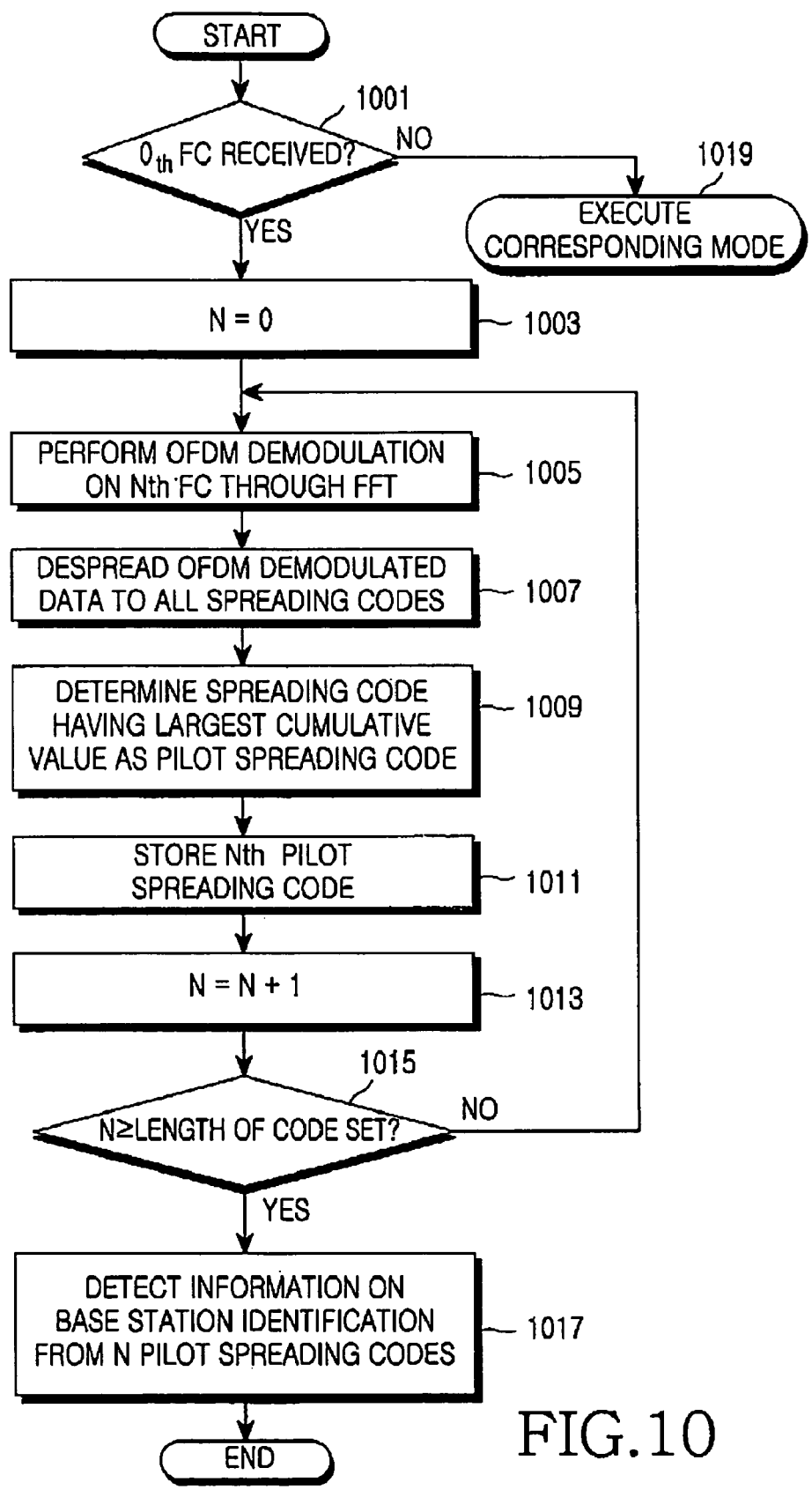
FIG. 10 is a flowchart illustrating a receiving process of a mobile station in an OFDMA-CDM according to an embodiment illustrating the present invention.

FIG. 10 is a flowchart illustrating a receiving process of the mobile station in the OFDMA-CDM system according to an embodiment of the present invention. The algorithm of FIG. 10 shows that the mobile station identifies the base station by detecting the pilot code pattern (or the pilot code set).

Referring to FIG. 10, in step 1001, the mobile station detects a preamble signal and determines if the 0th FC (a start FC for detection of a pilot code pattern) is received. In step 1019, if the 0th FC is not received, the mobile station performs a corresponding mode. In step 1003, if the 0th FC is received, the mobile station initializes to "0" a variable N representing an FC number.

In step 1005, the mobile station performs an OFDM demodulation of a received Nth FC through an FFT operation. In step 1007, the mobile station despreads the OFDM demodulated data on a TFC basis and accumulates them according to the spreading codes used in the despreading. In step 1009, the mobile station detects a spreading code corresponding to the largest symbol cumulative value among eight symbol cumulative values and determines it as a pilot spreading code. In step 1011, the mobile station stores in memory the detected spreading code as an Nth pilot spreading code.

In step 1013, the mobile station increases the variable N by 1. In step 1015, the mobile station determines if the variable N is less than the length of the pilot code set. If the variable N is less than the length of the pilot code set, the process returns to the step 1005 so as to demodulate a next FC. If the variable N is greater than or equal to the length of the pilot code set, the process proceeds to step 1017. In the step 1017, the mobile station identifies the base station by comparing the pilot spreading code sequence (0th to (N−1)th pilot spreading code sequence) with all of the pilot code patterns, and then ends the process. The number of the pilot spreading code sequence corresponds to the length of the pilot code set stored in the memory.

The embodiment of FIG. 10 shows the process of identifying the base station before the data communication. For the data communication, the detected pilot spreading code is directly transmitted to the data FC despreader 709. The data FC despreader 709 despreads the OFDM demodulated data with the remaining spreading codes except the pilot spreading code.

Figure 11:
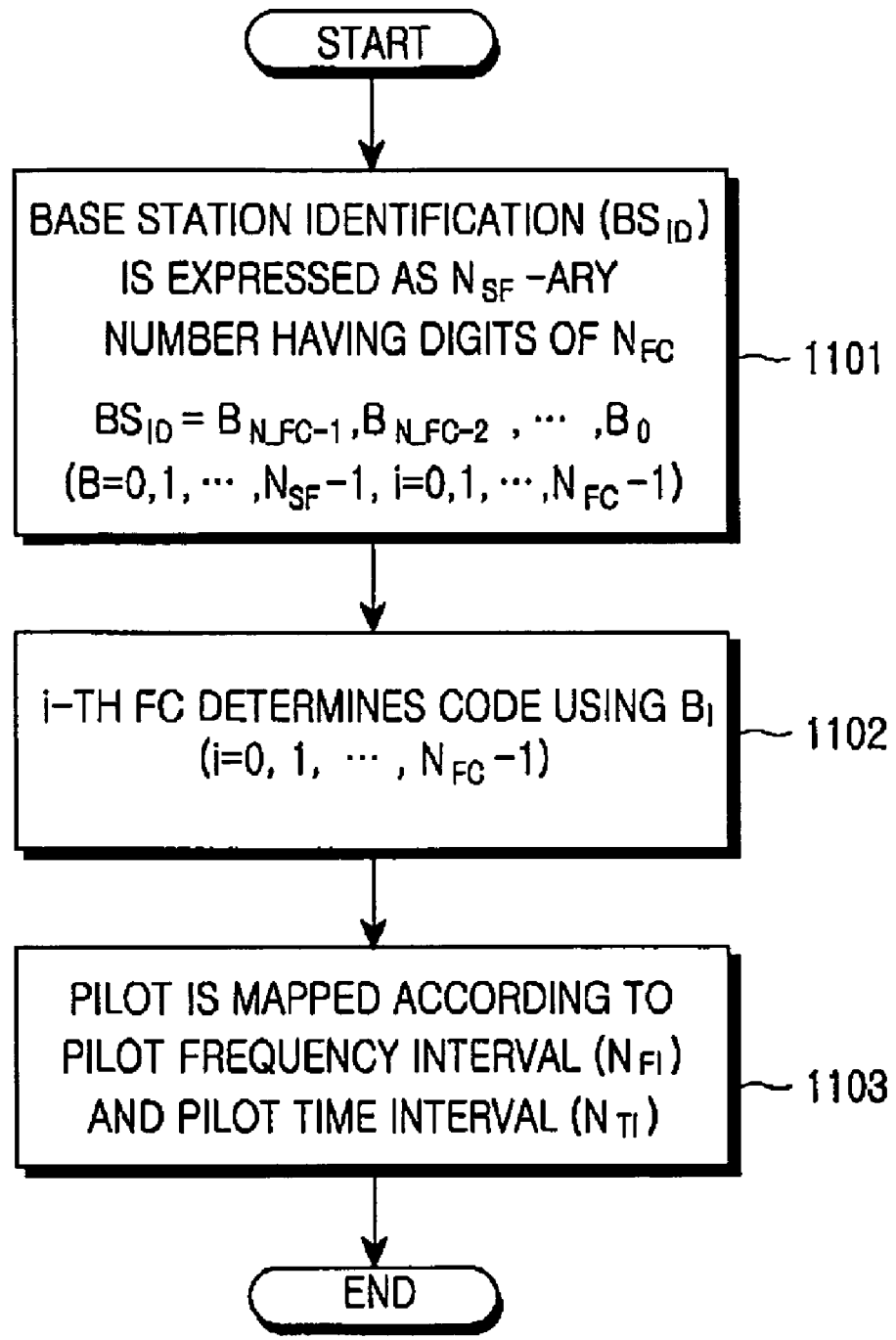
FIG. 11 is a flowchart illustrating a pilot mapping process of a base station in an OFDMA-CDM system according to an embodiment illustrating the present invention.

FIG. 11 is a flowchart illustrating a pilot mapping process of the base station in the OFDMA-CDM system according to an embodiment of the present invention.

Referring to FIG. 11, in step 1101, the base station expresses the base station identification (BSID) as Equation 1 below so that it can determine the spreading codes to be used for the respective FCs. In Equation 1, the base station identification ($BS_{ID}$) is expressed as $N_{SF}$-ary number having digits of $N_{FC}$ (the number of FCs).

$$BS_{ID}=[B_0, B_1, \ldots B_{N_{FC}-1}](N_{SF}) \qquad (1)$$

In Equation 1, $B_i$ is one of $0, 1, \ldots, N_{SF}-1$, and i has $0, 1, \ldots, N_{FC}-1$.

$B_i$ can be predefined by a pattern or can be generated every time a corresponding FC is generated.

In step 1102, the base station determines the spreading codes for the respective FCs by using $B_i$ (I=0, 1, ..., $N_{FC}-1$). If $B_i$=3, the pilot signal at the i-th FC is spread with $C_3$ code. In FIG. 3, it can be seen that $C_0$ is used in the 0th FC, $C_1$ in the first FC, and $C_{N_{FC}-1}$ in ($N_{FC}-1$)th FC, respectively.

In step 1013, after determining the pilot spreading codes to be used in the respectively FCs, the base station spreads the pilot signal with the determined spreading codes and maps the pilot spread data onto the corresponding TFC according to the pilot frequency interval ($N_{F1}$) and the pilot time interval ($N_{T1}$). Because the general channel estimation is also achieved using the mapped pilot signal, the pilot frequency interval should be determined by considering the coherence bandwidth. Also, the pilot time interval should be determined by considering the coherence time interval.

For example, the pilot signal can be mapped onto all of the TFCs by assigning "1" to both of the pilot frequency interval ($N_{F1}$) and the pilot signal time interval ($N_{T1}$). Alternatively, the pilot can be arranged by considering the slopes S.

A real application example will be described for a greater understanding of the present invention.

Figure 12:
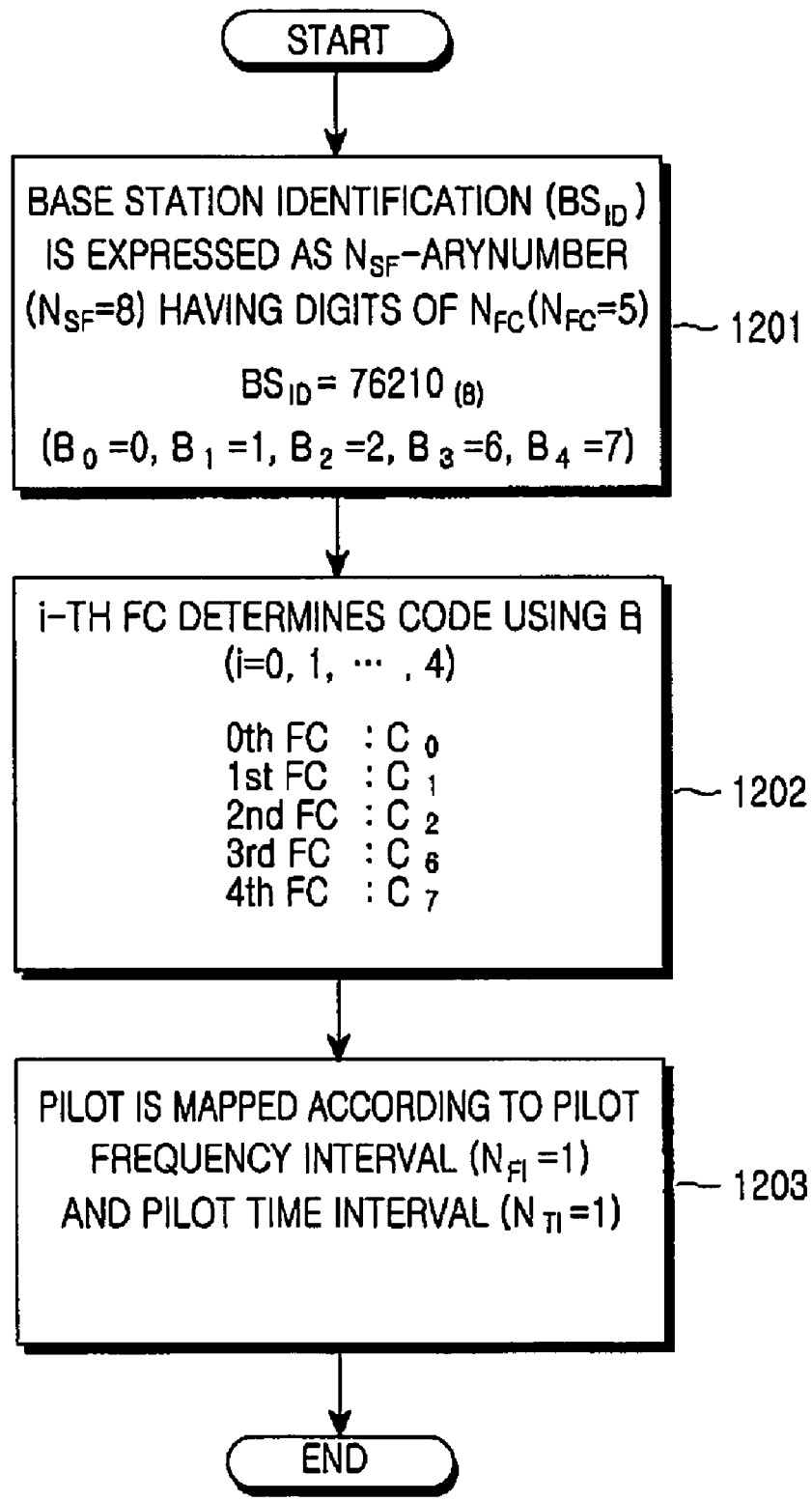
FIG. 12 is a diagram illustrating a pilot mapping process according to an application example of the present invention.

FIG. 12 is a diagram illustrating a pilot mapping process when the number of FCs for the transmission of pilot code pattern is "5" and the length of the spreading code is "8".

Referring to FIG. 12, in step 1201, the base station expresses the base station identification (BSID) as Equation 2 below so that it can determine the spreading codes to be used for the five FCs. In Equation 2, the base station identification ($BS_{ID}$) is expressed as 8 numbers having 5 digits (a total number of FCs).

$$BS_{ID}=[76210]_{(8)} \quad (2)$$

Here, $B_0=0$, $B_1=1$, $B_2=2$, $B_3=6$, and $B_4=7$

In step 1202, the base station determines the spreading codes for the respective FCs by using $B_i$ (i=0, 1, 2, 3, 4). $C_0$, $C_1$, $C_2$, $C_6$ and $C_7$ are determined as the spreading codes for the 0th FC, the first FC, the second FC, the third FC and the fourth FC, respectively.

In step 1203, the base station spreads the pilot signal of each FC with the determined spreading codes and maps the pilot spread data onto the corresponding TFC according to the pilot frequency interval ($N_{F1}=1$) and the pilot time interval ($N_{T1}=1$), which are previously determined.

According to the present invention, because the pilot signal as well as the data is spread, it is easy to implement the transmitter. Also, because it is possible to identify the base station according to the pilot spreading code as well as the pilot signal hopping pattern, a greater number of base stations can be easily identified. Consequently, the efficient use of the limited radio resources (i.e., the limited pilot pattern resources) results in the improvement of the entire system performance.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A base station for use in a wideband wireless communication system where an FC (frame cell) covers a total frequency band and a time interval and the FC includes a plurality of TFCs (time-frequency cells) each of which has at least one OFDM (Orthogonal Frequency Division Multiplexing) symbol interval and at least one sub-carrier, the base station comprising:

a pilot code pattern generator for initializing to zero a variable N representing an FC number, and generating an Nth spreading code for an Nth FC among spreading codes according to an IDentifier (ID) of the base station, the spreading codes being included in a code set;

a first spreader for spreading a pilot symbol mapped onto an Nth FC with the Nth spreading code, and controlling a gain so as to transmit the pilot symbol at a higher signal level than data;

a second spreader for spreading data symbols mapped onto the Nth FC with spreading codes from the code set except for the Nth spreading code;

a mapper for mapping a spread signal from the first spreader and spread signals from the second spreader on a TFC basis, and outputting signals that constitute each TFC to points of sub-carriers; and an IFFT (Inverse Fast Fourier Transform) unit for an IFFT processing output signals from the mapper, wherein the pilot code pattern generator increases the variable N by 1 if the Nth FC signal is generated, determines if the variable N is greater than a number of the spreading codes included in the code set, and generates the Nth spreading code among the spreading codes of the code set if the variable N is less than the length of the code set.

2. The base station of claim 1, wherein the codes that are included in the code set are determined corresponding to a predetermined duration which is at least one FC time interval.

3. The base station of claim 1, wherein the mapper maps so as to assign the pilot symbol to all of the TFCs of the FC.

4. The base station of claim 1, wherein the mapper maps so as to assign the pilot symbol to specific TFCs according to a hopping pattern.

5. The base station of claim 1, wherein the spreading code is a Walsh code.

6. The base station of claim 1, further comprising:

a controller for generating a control signal to process transmission data on an FC basis;

a first modulator for encoding transmission data according to a code rate, and modulating the encoded data according to a modulation order;

a first preamble distributor for mapping data symbols output from the first modulator onto a corresponding FG according to the control signal, and outputting the mapped data symbols to the second spreader; and a second modulator for modulating pilot data according to a modulation order; and a second preamble distributor for mapping pilot symbols output from the second modulator onto the corresponding FC according to the control signal, and outputting the mapped pilot symbols to the first spreader.

7. A transmitting method of a base station in a wideband wireless communication system where an FC (frame cell) covers a width of a frequency band and a time interval and the FC includes a plurality of TFCs (time-frequency cells) each of which has at least one OFDM (Orthogonal Frequency Division Multiplexing) symbol interval and at least one sub-carrier, the transmitting method comprising the steps of:

determining a code set that includes a number of spreading codes, based on a specific ID of the base station;

initializing to zero a variable N representing an FC number;

spreading a pilot symbol mapped onto an Nth FC with the Nth spreading code among the spreading codes, and controlling a gain so as to transmit the pilot symbol at a higher signal level than data, thereby generating a pilot spread signal;

spreading a plurality of data symbols mapped onto the Nth FC with spreading codes of the code set except for the Nth spreading code, thereby generating data spread signals;

grouping the pilot spread signal and the data spread signals on a TFC basis, and mapping signals that constitute each TFC onto sub-carriers;

OFDM modulating the mapped signals through an IFFT operation;

increasing the variable N by 1 and determining if the variable N is greater than a length of the code set; and if the variable N is less than the number of the spreading codes included in the code set, returning to the step of generating the pilot spread signal.

8. The transmitting method of claim 7, wherein the specific ID of the base station is expressed as N-ary number having M digits, where N represents the length of the spreading code and M represents the length of the code set.

9. The transmitting method of claim 7, wherein the width of the frequency band that is covered by the FC is a total frequency band.

* * * * *